United States Patent
Reed et al.

(10) Patent No.: US 11,614,868 B2
(45) Date of Patent: Mar. 28, 2023

(54) DATA SET OVERLAY PROTECTION

(71) Applicant: International Business Machines Corporation, Armonk, NY (US)

(72) Inventors: David C. Reed, Tucson, AZ (US); Kenneth J. Owin, Tucson, AZ (US); Philip R. Chauvet, Tucson, AZ (US); Tabor Powelson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 16/587,377

(22) Filed: Sep. 30, 2019

(65) Prior Publication Data

US 2021/0096752 A1 Apr. 1, 2021

(51) Int. Cl.
*G06F 12/00* (2006.01)
*G06F 3/06* (2006.01)

(52) U.S. Cl.
CPC ............ *G06F 3/0619* (2013.01); *G06F 3/064* (2013.01); *G06F 3/067* (2013.01); *G06F 3/0653* (2013.01); *G06F 3/0659* (2013.01)

(58) Field of Classification Search
CPC ...... G06F 3/0619; G06F 3/064; G06F 3/0653; G06F 3/0659; G06F 3/067
See application file for complete search history.

(56) References Cited

U.S. PATENT DOCUMENTS

| | | | | |
|---|---|---|---|---|
| 4,947,318 A * | 8/1990 | Mineo | ..................... | G06F 12/14 726/19 |
| 5,315,447 A * | 5/1994 | Nakayama | ............ | G06F 3/0601 360/49 |
| 5,835,939 A * | 11/1998 | Kurokawa | ............ | G06F 3/0607 711/113 |
| 6,112,277 A * | 8/2000 | Bui | ........................ | G06F 3/0638 711/111 |
| 6,674,599 B1 * | 1/2004 | Rae | .......................... | G11B 27/11 |

(Continued)

OTHER PUBLICATIONS

Srivatsa, Mudhaker, et al., "TrustGuard: Countering Vulnerabilities in Reputation Management for Decentralized Overlay Networks", Proceedings of the 14th International Conference on World Wide Web, Chiba, Japan, Jan. 2005.

(Continued)

*Primary Examiner* — David Yi
*Assistant Examiner* — Tahilba O Puche
(74) *Attorney, Agent, or Firm* — Nelson IP; Daniel P. Nelson

(57) ABSTRACT

A method for preventing data overlays in a data storage system is disclosed. In one embodiment, such a method detects a write operation directed to a storage area of a data storage system. The write operation includes one or more of a format write operation and a full-track write operation. Upon detecting the write operation, the method determines a data set that is associated with the storage area. The method analyzes metadata associated with the data set to determine whether the storage area contains valid data. In the event the storage area contains valid data, the method performs a data protection operation that prevents execution of the write operation and/or logs details of the write operation. A corresponding system and computer program product are also disclosed.

17 Claims, 6 Drawing Sheets

(56) References Cited

U.S. PATENT DOCUMENTS

| | | | | |
|---|---|---|---|---|
| 6,715,030 | B1* | 3/2004 | Vandenbergh | G06F 3/0653 711/170 |
| 7,310,743 | B1* | 12/2007 | Gagne | G06F 11/1471 714/6.31 |
| 7,694,119 | B1* | 4/2010 | Scharland | G06F 3/0607 713/1 |
| 8,327,087 | B1 | 12/2012 | Ahlquist | |
| 9,557,918 | B2 | 1/2017 | Gair, Jr. et al. | |
| 9,632,700 | B2 | 4/2017 | Bailey et al. | |
| 9,703,593 | B2 | 7/2017 | Lee et al. | |
| 9,824,095 | B1 | 11/2017 | Taylor et al. | |
| 10,146,694 | B1 | 12/2018 | Laier et al. | |
| 2003/0126359 | A1* | 7/2003 | Debiez | G06F 3/0601 711/112 |
| 2005/0044548 | A1 | 2/2005 | Page | |
| 2005/0165853 | A1* | 7/2005 | Turpin | G06F 3/0608 |
| 2006/0002246 | A1* | 1/2006 | Emberty | G11B 19/04 369/30.03 |
| 2006/0203373 | A1* | 9/2006 | Dahman | G11B 23/107 360/69 |
| 2009/0006907 | A1 | 1/2009 | Little | |
| 2009/0210615 | A1 | 8/2009 | Struk et al. | |
| 2016/0349996 | A1* | 12/2016 | Gair, Jr. | G06F 3/0656 |
| 2018/0011917 | A1 | 1/2018 | Mueller et al. | |
| 2018/0217940 | A1 | 8/2018 | Joshi et al. | |
| 2018/0225058 | A1 | 8/2018 | Kaushik et al. | |
| 2019/0095240 | A1* | 3/2019 | Hayes | G06F 13/16 |
| 2019/0347020 | A1* | 11/2019 | Allo | G06F 3/0619 |
| 2020/0081762 | A1* | 3/2020 | Chauvet | G06F 11/0727 |

OTHER PUBLICATIONS

Kotla, Ramakrishna, et al., "SafeStore: A Durable And Practical Storage System", Proceedings of the 2007 USENIX Annual Technical Conference, Jan. 2007.

Tang, Yang, et al., "FADE: Secure Overlay Cloud Storage With File Assured Deletion", International Conference on Security and Privacy in Communication Systems, Sep. 2010.

Vahldiek-Oberwagner, Anjo, et al., "Guardat: Enforcing Data Policies at the Storage Layer", EuroSys '15 Proceedings of the Tenth European Conference on Computer Systems, Apr. 2015.

* cited by examiner

DATA SET OVERLAY PROTECTION

BACKGROUND

Field of the Invention

This invention relates to systems and methods for preventing data overlays in data storage environments.

Background of the Invention

Computing systems produce data that is often susceptible error. For example, in network environments, where multiple users access the same production data, perhaps concurrently, the production data's susceptibility to error is high. One type of error that may occur in such environments is a data set overlay. With such an error, data is erroneously written over previously stored data, thereby corrupting and possibly causing irreversible loss of the previously stored data. For example, a data overlay may occur when data from a first data set is erroneously written over data of a second data set. This may be the result of a program error, malicious activity, human error, or the like. In environments where production data is mirrored from a primary location to a secondary location, errors associated with the data set overlay may also be mirrored, thereby causing data loss or corruption at the secondary location. Data set overlays can have tremendous impacts in data storage environments, including causing not only data loss, but also potentially system outages.

Unfortunately, data set overlays may be extremely difficult to detect and diagnose in data storage environments. Current detection and diagnostic methods in z/OS environments generally utilize a generalized trace facility (GTF) trace to detect and diagnose data set overlays. This type of trace, however, may require significant overhead to execute. It also typically does not prevent data set overlays from occurring. Furthermore, unless a data set overlay is detected and documented very soon after if occurs, GTF trace data typically wraps (i.e., overwrites itself), thereby erasing needed diagnostic data and making it unavailable to service personnel.

In view of the foregoing, systems and methods are needed to more effectively diagnose and prevent data overlays. Ideally, such systems and methods will reduce overhead compared to diagnostic utilities such as generalized trace facility (GTF) or other utilities.

SUMMARY

The invention has been developed in response to the present state of the art and, in particular, in response to the problems and needs in the art that have not yet been fully solved by currently available systems and methods. Accordingly, embodiments of the invention have been developed to prevent data overlays in data storage environments. The features and advantages of the invention will become more fully apparent from the following description and appended claims, or may be learned by practice of the invention as set forth hereinafter.

Consistent with the foregoing, a method for preventing data overlays in a data storage system is disclosed. In one embodiment, such a method detects a write operation directed to a storage area of a data storage system. The write operation includes one or more of a format write operation and a full-track write operation. Upon detecting the write operation, the method determines a data set that is associated with the storage area. The method analyzes metadata associated with the data set to determine whether the storage area contains valid data. In the event the storage area contains valid data, the method performs a data protection operation that prevents execution of the write operation and/or logs details of the write operation.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
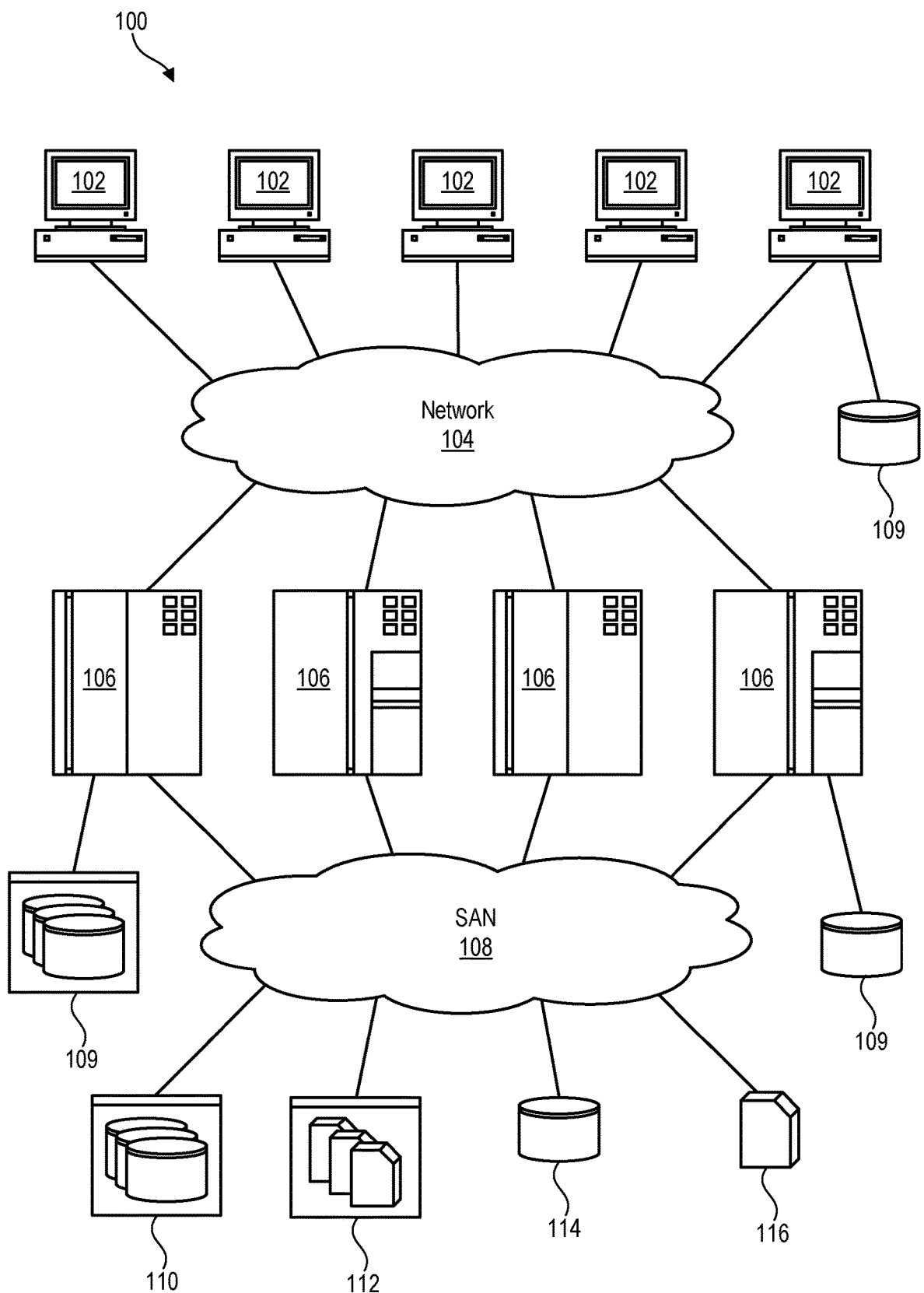
FIG. 1 is a high-level block diagram showing an example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 109 (e.g., arrays of hard-storage drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard or protocol such as Fibre Channel (FC) or iSCSI.

Figure 2:
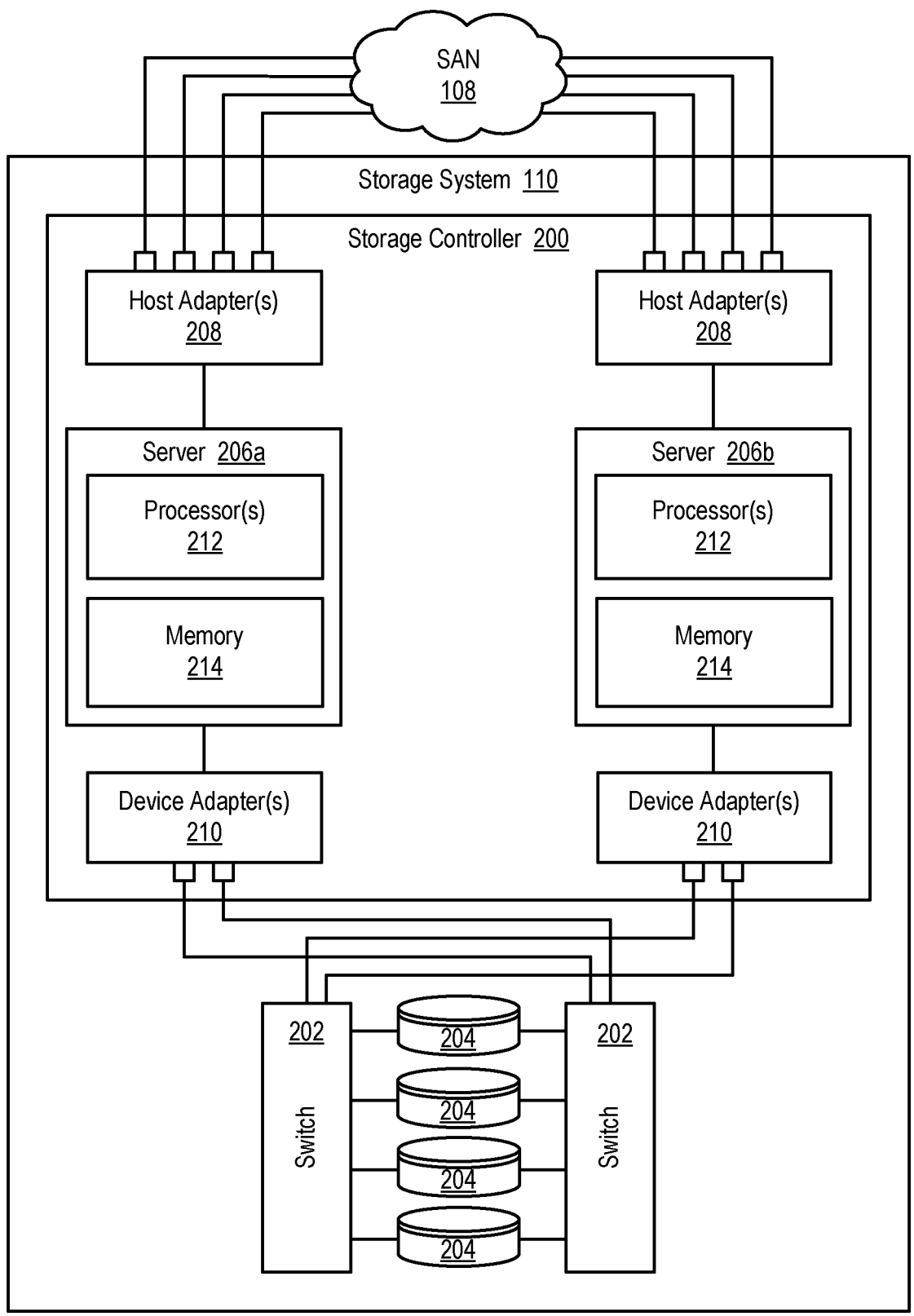
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. The storage system 110 is illustrated to show an exemplary environment in which errors such as data overlays may occur. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes 322 implemented on the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
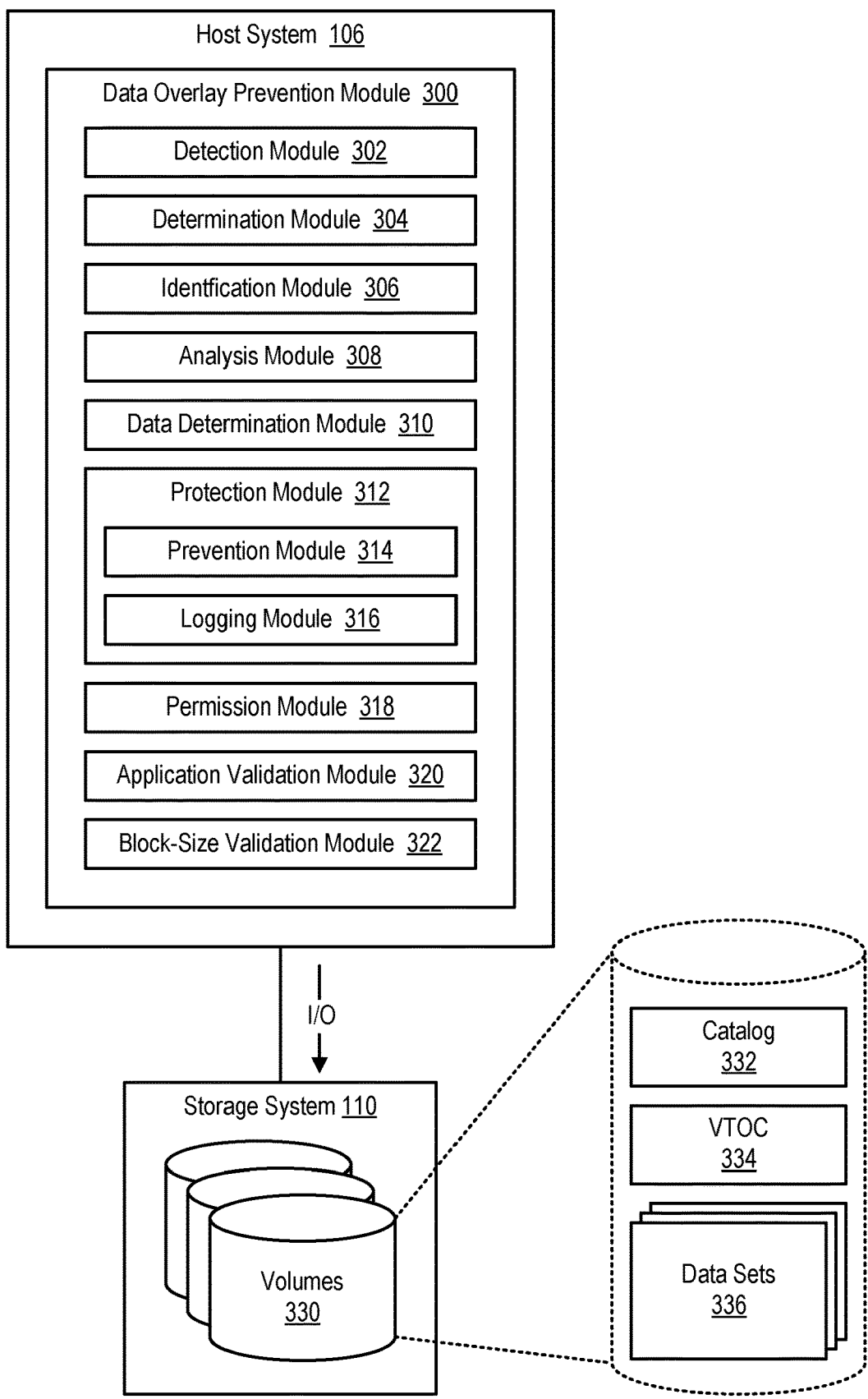
FIG. 3 is a high-level block diagram showing a data overlay prevention module configured to prevent data overlays in a storage system.

Referring to FIG. 3, environments such as that illustrated in FIGS. 1 and 2 may store and provide access to data that is susceptible error. Because such environments may enable multiple users to access the same production, perhaps concurrently, the production data's susceptibility to error is high. One type of error that may occur in such environments is a data set overlay. With such an error, new or existing data is erroneously written over previously stored data, thereby corrupting and possibly causing irreversible loss of the previously stored data. In environments where production data is mirrored from a primary location to a secondary location, errors and/or corruption associated with the data set overlay may also be mirrored, thereby causing data loss or corruption at the secondary location.

Unfortunately, data set overlays may be difficult to detect and diagnose in environments such as that illustrated in FIGS. 1 and 2. Current detection and diagnostic methods in z/OS environments generally utilize a generalized trace facility (GTF) trace to detect and diagnose data set overlays. This type of trace, however, may require significant overhead to execute. It also typically does not prevent data set overlays from occurring. Furthermore, unless a data set overlay is detected and documented very soon after if occurs, GTF trace data may wrap, thereby erasing needed diagnostic data and making it unavailable to service personnel. Thus, systems and methods are needed to more effectively diagnose and prevent data set overlays.

In certain embodiments, a data overlay prevention module 300 may be implemented on a host system 106 to prevent data overlays on a storage system 110. FIG. 3 is a high-level block diagram showing a data overlay prevention module 300 and associated sub-modules. The data overlay prevention module 300 and associated sub-modules may be implemented in hardware, software, firmware, or combinations thereof. The data overlay prevention module 300 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the data overlay prevention module 300 may include one or more of a detection module 302, determination module 304, identification module 306, analysis module 308, data determination module 310, protection module 312, permission module 318, application validation module 320, and block-size validation module 322. The protection module 312 may include one or more of a prevention module 314 and a logging module 316. As shown, the data overlay prevention module 300 and associated sub-modules are implemented within a host system 106. However, the data overlay prevention module 300 and associated sub-modules are not limited to implementation within such a host system 106.

As shown, the detection module 302 may be configured to detect certain types of write operations that may be associated with data overlays or be more likely to cause data overlays. For example, in certain embodiments, the detection module 302 may be configured to detect format write operations and/or full-track write operations. When storage space is allocated to a data set 336 (i.e., a named collection of records), tracks of the data set 336 may be formatted using format write operations. These format write operations may, among other things, establish a block size for the tracks. Once formatted, the tracks will generally not be formatted again. Any write operation that occurs to a track after it has been formatted will typically generate an I/O error if it does not conform to the established block size associated with the track. Thus, the data overlay prevention module 300 may be configured to examine any format write operation that is performed to a track after it has already been formatted to ensure that it will not result in an undesirable data overlay.

A full-track write operation, by contrast, may replace the entire contents of a track with another full-track image, including any formatting associated with block size. The data overlay prevention module 300 may also be configured to examine full-track write operations that are performed on a track to ensure that they do not result in an undesirable data overlay. Thus, in certain embodiments, the detection module 302 may be configured to detect when write operations such as format write operations and/or full-track write operations (hereinafter "write operations") are performed to a data set 336 on the storage system 110.

Figure 4:
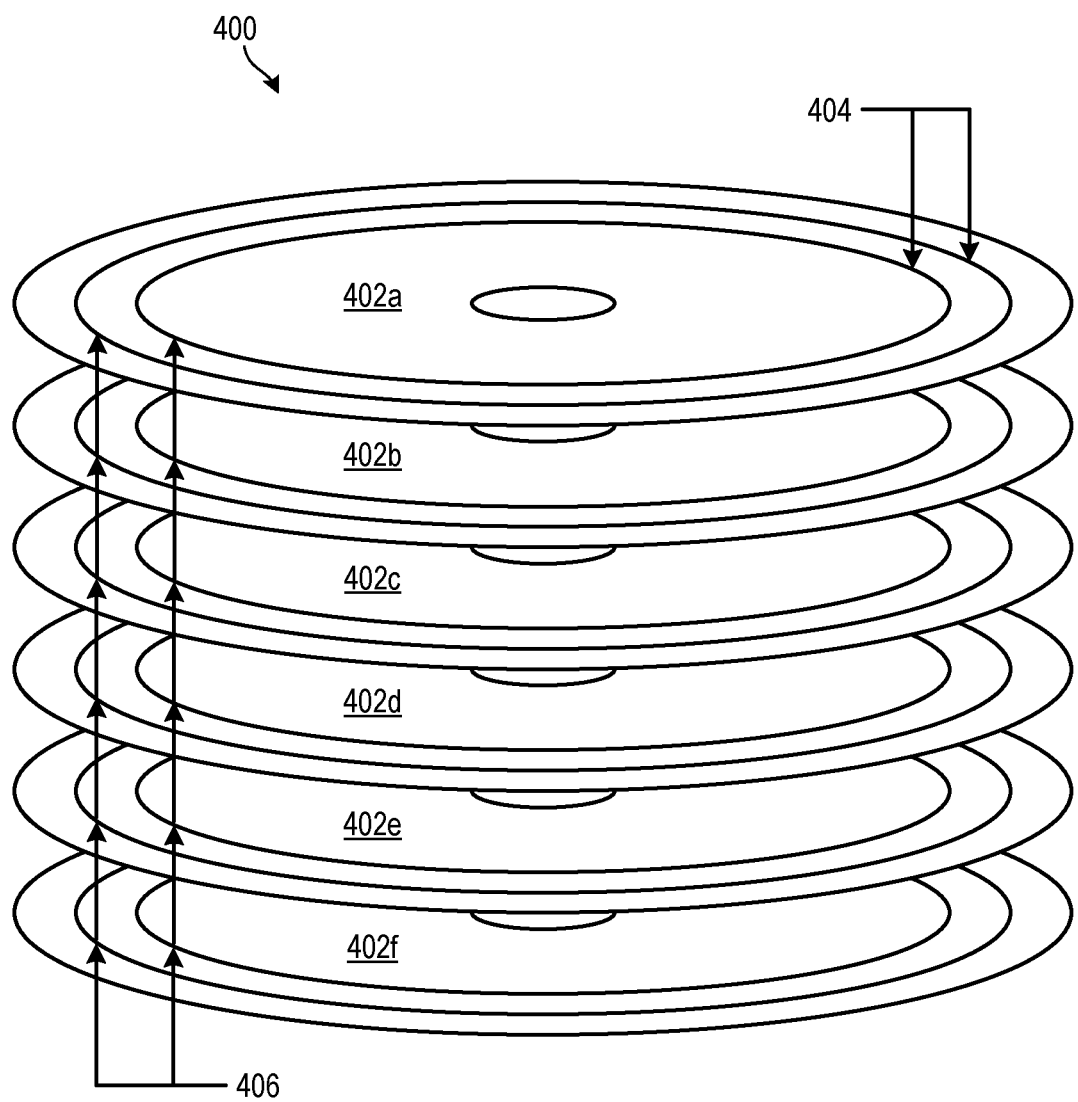
FIG. 4 is a high-level block diagram showing platters, tracks, and cylinders within a disk drive.

When a format write operation and/or full-track write operation is detected, the determination module 304 may be configured to determine what data set 336 is the target of the write operation. In certain embodiments, this may be accomplished by analyzing metadata such as a CCHH (cylinder and head numbers) and CCW (channel command word) associated with the write operation. For reference, FIG. 4 shows a high-level view of a disk drive 204 comprising multiple platters 402, tracks 404 on the platters, and cylinders 406 made up of corresponding tracks 404 across multiple platters 402. The write operation discussed above may be directed to such tracks 404 and cylinders 406 within the disk drive 204. In certain embodiments, the tracks 404 hosting a data set 336 may be determined by analyzing metadata associated with the data set 336 in one or more of the VTOC 334, catalog 332, and/or a VSAM volume data set (VVDS).

Referring again to FIG. 3, once the data set 336 associated with a write operation is determined, the identification module 306 may identify metadata associated with the data set 336 and the analysis module 308 may analyze the metadata to determine whether the data set 336 has a data protection feature enabled to validate incoming write operations for possible data overlay issues. This may be accomplished by analyzing an indicator that may be set for the data set 336 (such as in the volume table of contents, or VTOC) and/or the volume 330 on which the data set 336 resides. Thus, the data protection feature may be enabled for the data set 336 and/or the volume 330 to enable validation of write operations at the data set 336 and/or volume 330 levels.

Figure 5:
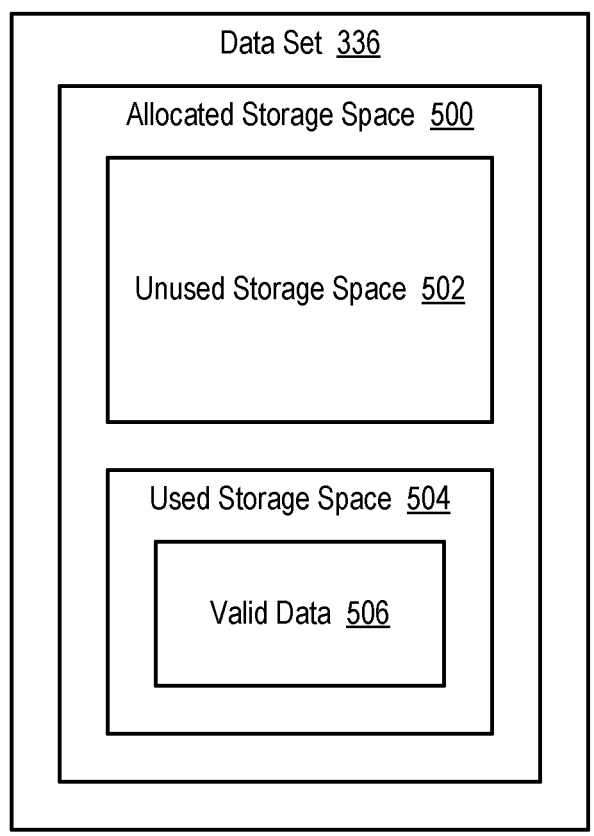
FIG. 5 is a high-level block diagram showing storage space within a data set.

If validation is enabled for the data set 336, the data determination module 310 may determine whether the write operation is directed to valid data within the data set 336. That is, the data determination module 310 may determine, within allocated storage space 500 of the data set 336, whether the write operation is directed to portions 504 of the data set 336 that contain valid data 506 or, conversely, to portions 502 of the data set 336 that are empty or do not contain valid data 506, as shown in FIG. 5. If the data set 336 is a Virtual Storage Access Method (VSAM) data set 336, information in a catalog 332 may in certain embodiments be analyzed to determine a high used relative byte address (HURBA) value. This value may be converted to a CCHH value that represents a last track in the data set 336 that has been written with valid data. Any tracks beyond this point typically do not contain valid data. For non-VSAM data sets 336, DS1LSTAR and DS1TRBAL values within the VTOC 334 may be checked to determine where the end of valid data is located in the data set 336.

In the event the write operation (i.e., the format write operation or full-track write operation) is directed to an area (e.g., track) containing valid data within the data set 336, the protection module 312 may perform operations to protect valid data and prevent data overlays. In certain cases, depending on the data protection feature, a prevention module 314 within the protection module 312 may terminate the write operation, thereby preventing the write operation from occurring. In other cases, a logging module 316 may log details of the write operation. That is, the write operation may be allowed to occur but the logging module 316 may gather additional information about the write operation. In certain embodiments, this information may be provided to service personnel so they may analyze the information to determine whether a data overlay or other error occurred as a result of the write operation.

In the event a write operation is not directed to an area (e.g., track) containing valid data within the data set 336, the permission module 318 may permit the write operation to occur. That is, the permission module 318 may permit the format write operation and/or full-track write operation to occur to the data set 336 since the write operation will not affect or overwrite valid data. In certain embodiments, an application validation module 320 may determine whether a write operation originates from a trusted application. If the write operation originates from a trusted application, the permission module 318 may allow the write operation to occur even if the write operation does affect or overwrite valid data.

In certain embodiments, in the event a storage area (e.g., track) within a data set 336 does not contain valid data but is nevertheless within a data range of the data set 336, a block-size validation module 322 may determine whether a block size associated with the write operation corresponds to a block size established for the rest of the data set 336. This may help to determine whether the write operation is valid or erroneous. If a CCW of the write operation contains a block size value that is inconsistent with the rest of the data set 336, the write operation may be rejected (i.e., not sent to the channel between the host system 106 and the storage system 110) and a diagnostic dump may be performed and/or a log entry may be created depending on whether the data protection function previously discussed is enabled for the data set 336.

Figure 6:
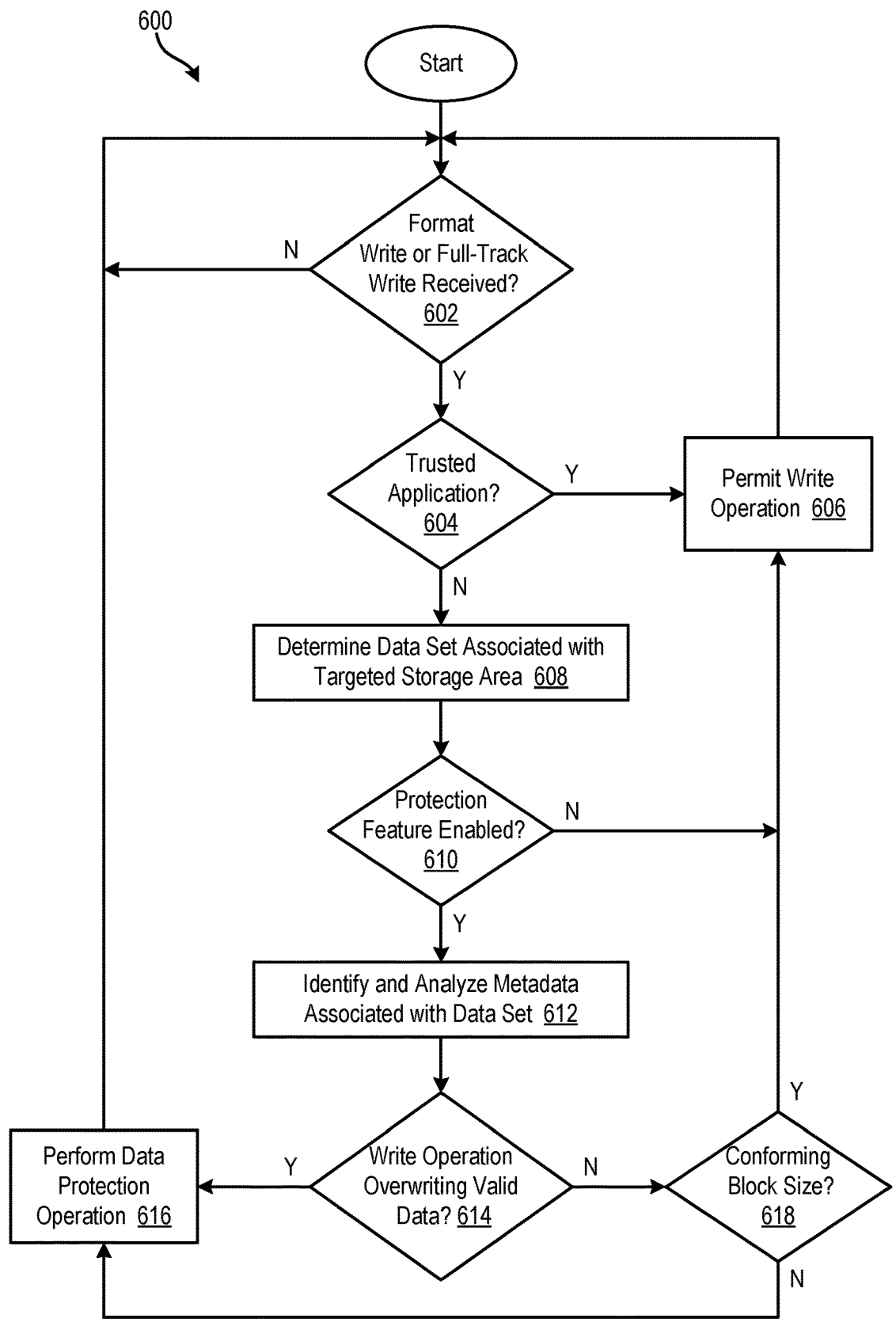
FIG. 6 is a flow diagram showing one embodiment of a method for preventing data overlays in a storage system.

Referring to FIG. 6, one embodiment of a method 600 for preventing data overlays in a storage system 110 is illustrated. In certain embodiments, such a method 600 may be executed by the data overlay prevention module 300 previously described. The method 600 is simply an example of how the data overlay prevention module 300 may work and is not intended to be limiting.

As shown, the method 600 initially determines 602 whether a format write operation or full-track write operation has been received. If so, the method 600 determines 604 whether the write operation originates from a trusted application. If so, the method 600 permits 606 execution of the write operation.

If the write operation does not originate from a trusted application, the method 600 determines 608 a data set 336 that is associated with the write operation. In certain embodiments, this may be accomplished by analyzing CCHH and CCW values associated with the write operation and determining a data set 336 that corresponds to the values. Once the data set 336 is determined 608, the method 600 determines 610 whether the data set 336 has the data protection feature enabled. In other words, the method 600 determines 610 whether the write operation should be validated. If the data protection function is not enabled, the method 600 permits 606 the write operation to be executed against the data set 336.

If, on the other hand, the data protection function is enabled, the method 600 identifies 612 and analyzes 612 metadata (e.g., catalog 332, VTOC 334, etc.) associated with the data set 336. This may done to determine where valid data ends within allocated storage space 500 of the data set 336. At this point, the method 600 determines 614 whether the write operation will overwrite valid data in the data set 336. If so, the method 600 performs 616 a data protection operation to protect the valid data. In certain embodiments, the data protection operation involves rejecting the write operation so that it does not modify the data set 336. In other embodiments, the data protection operation performs logging to gather additional information about the write operation if and when it is executed against the data set 336.

In the event the write operation does not overwrite valid data, the method 600 may check 618 whether a block size associated with the write operation conforms to a block size of other portions (e.g., tracks) of the data set 336. If not, the method 600 performs the data protection function previously described by rejecting the write operation and/or logging details of the write operation. If, on the other hand, the block size associated with the write operation conforms to the block size of the rest of the data set 336, the method 600 permits 606 the write operation to be performed against the data set 336.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for preventing data overlays in a data storage system, the method comprising:
    detecting a write operation directed to a storage area of a data storage system;
    determining whether the write operation is at least one of a format write operation and a full-track write operation;
    determining a data set that is associated with the storage area;
    analyzing metadata associated with the data set to determine a last track of the data set on disk that has been written with valid data, wherein analyzing the metadata comprises determining a high used relative byte address (HURBA) value associated with the data set and converting this HURBA value into a cylinder and head number (CCHH) in order to determine a last track of the data set on disk that has been written with valid data; and
    in response to determining that the storage area is not located beyond the last track and the write operation is at least one of a format write operation and a full-track write operation, performing a data protection operation, the data protection operation comprising at least one of preventing the write operation and logging details of the write operation.

2. The method of claim 1, further comprising, in response to determining that the storage area is located beyond the last track, permitting the write operation to be performed to the storage area.

3. The method of claim 1, further comprising, in response to determining that the storage area is not located beyond the last track but the write operation originates from a trusted application, permitting the write operation to be performed to the storage area.

4. The method of claim 1, further comprising, in response to determining that the storage area is located beyond the last track but the storage area is within allocated space of the data set, determining whether a block size associated with the write operation conforms to a block size associated with the data set.

5. The method of claim 4, further comprising, in response to determining that the block size associated with the write operation does not conform to the block size associated with the data set, preventing the write operation from being performed to the storage area.

6. The method of claim 4, further comprising, in response to determining that the block size associated with the write operation conforms to the block size associated with the data set, permitting the write operation to be performed to the storage area.

7. A computer program product for preventing data overlays in a data storage system, the computer program product comprising a non-transitory computer-readable medium having computer-usable program code embodied therein, the computer-usable program code configured to perform the following when executed by at least one processor: detect a write operation directed to a storage area of a data storage system; determine whether the write operation is at least one of a format write operation and a full-track write operation; determine a data set that is associated with the storage area; analyze metadata associated with the data set to determine a last track of the data set on disk that has been written with valid data, wherein analyzing the metadata comprises determining a high used relative byte address (HURBA) value associated with the data set and converting this HURBA value into a cylinder and head number (CCHH) in order to determine a last track of the data set on disk that has been written with valid data; and in response to determining that the storage area is not located beyond the last track and the write operation is at least one of a format write operation and a full-track write operation, perform a data protection operation, the data protection operation comprising at least one of preventing the write operation and logging details of the write operation.

8. The computer program product of claim 7, wherein the computer-usable program code is further configured to, in response to determining that the storage area is located beyond the last track, permit the write operation to be performed to the storage area.

9. The computer program product of claim 7, wherein the computer-usable program code is further configured to, in response to determining that the storage area is not located beyond the last track but the write operation originates from a trusted application, permit the write operation to be performed to the storage area.

10. The computer program product of claim 7, wherein the computer-usable program code is further configured to, in response to determining that the storage area is located beyond the last track but the storage area is within allocated space of the data set, determine whether a block size associated with the write operation conforms to a block size associated with the data set.

11. The computer program product of claim 10, wherein the computer-usable program code is further configured to, in response to determining that the block size associated with the write operation does not conform to the block size associated with the data set, prevent the write operation from being performed to the storage area.

12. The computer program product of claim 10, wherein the computer-usable program code is further configured to, in response to determining that the block size associated with the write operation conforms to the block size associated with the data set, permit the write operation to be performed to the storage area.

13. A system for preventing data overlays in a data storage system, the system comprising:
   at least one processor;
   at least one memory device coupled to the at least one processor and storing instructions for execution on the at least one processor, the instructions causing the at least one processor to:
      detect a write operation directed to a storage area of a data storage system;
      determine whether the write operation is at least one of a format write operation and a full-track write operation;
      determine a data set that is associated with the storage area;
      analyze metadata associated with the data set to determine a last track of the data set on disk that has been written with valid data, wherein analyzing the metadata comprises determining a high used relative byte address (HURBA) value associated with the data set and converting this HURBA value into a cylinder and head number (CCHH) in order to determine a last track of the data set on disk that has been written with valid data; and
      in response to determining that the storage area is not located beyond the last track and the write operation is at least one of a format write operation and a full-track write operation, perform a data protection operation, the data protection operation comprising at least one of preventing the write operation and logging details of the write operation.

14. The system of claim 13, wherein the instructions further cause the at least one processor to, in response to determining that the storage area is located beyond the last track, permit the write operation to be performed to the storage area.

15. The system of claim 13, wherein the instructions further cause the at least one processor to, in response to determining that the storage area is not located beyond the last track but the write operation originates from a trusted application, permit the write operation to be performed to the storage area.

16. The system of claim 13, wherein the instructions further cause the at least one processor to, in response to determining that the storage area is located beyond the last track but the storage area is within allocated space of the data set, determine whether a block size associated with the write operation conforms to a block size associated with the data set.

17. The system of claim 16, wherein the instructions further cause the at least one processor to, in response to determining that the block size associated with the write operation does not conform to the block size associated with the data set, prevent the write operation from being performed to the storage area.

* * * * *